2,945,078
ALKALINE ELECTRIC CELLS

Christopher L. C. Chapman, Sutton, and Peggy Jane Skinner, New Malden, England, assignors to Yardney International Corp., New York, N.Y., a corporation of New York No Drawing. Filed Dec. 3, 1956, Ser. No. 625,627

Claims priority, application Great Britain Dec. 16, 1955

4 Claims. (Cl. 136—20)

This invention relates to alkaline electric cells and is particularly, although not exclusively, concerned with such cells in which the positive electrode is of silver, the negative electrode is of zinc and the electrolyte includes potassium hydroxide, e.g. as disclosed in U.S. Patents 2,594,711-4.

The discharge characteristic of a silver/zinc cell occurs in two stages, namely, a first stage during which the cell discharges at about 1.8 volts and a second stage, commencing after the cell is one quarter to one-third discharged, during which the voltage is maintained at a steady level between 1.5 and 1.55 volts.

This two-stage characteristic also occurs when the battery is charged. In general it is found that for about the first third of the charging period the voltage of the cell is of the order of 1.66 volts, there is then a rise in voltage usually to about 1.93 to 1.95 volts and the voltage then remains substantially constant until the last two hours of the charging period when it gradually rises to 2.1 volts. During charging, silver is initially oxidized to form silver oxide and later some of the silver oxide already formed is further oxidized to form the peroxide of silver. Thus the rise in voltage during charging from about 1.65 to about 1.93 volts would appear to take place when a definite small proportion of silver peroxide has been formed. At the beginning of the discharge cycle the first, high-voltage stage occurs when this silver peroxide is being reduced to silver oxide. Further discharge of the cells of the battery at a voltage between 1.50 and 1.55 is probably entirely due to the reduction of silver oxide to form silver.

It is often desirable, for example where the cell is a battery used for energizing vacuum-tube filaments, that the first or higher-voltage stage should be, so far as possible, suppressed. It is possible entirely to eliminate this stage by partially discharging the cells of the battery before use but this reduces the available capacity of the battery; moreover it is often inconvenient to carry out such prior discharge.

It is therefore a general object of the present invention to provide a method of and means for improving the discharge characteristics of an alkaline electric cell.

A particular object of the present invention is to provide a silver/zinc cell which, on discharge, has a considerably preshortened high-voltage stage so that a greater proportion of the capacity of the battery is available at a substantially constant discharge voltage.

The invention, broadly speaking, comprises the introduction of a halide into the active material of the positive electrode. According to one aspect of the invention it comprises the incorporation into the positive electrode material of a substantially insoluble halide, preferably of the same metal as the positive electrode material.

According to a more specific aspect of the invention, the positive electrode of a silver/zinc alkaline electrochemical cell incorporates a silver halide. Preferably the silver halide is silver chloride but it may comprise the bromide, iodide or fluoride or mixtures thereof.

The halide may be introduced into the positive electrodes of this invention in numerous ways outlined in detail hereafter.

According to the first embodiment of this invention, silver-chloride powder and silver powder are mixed together and compressed to form a positive plate. This compressed plate may, if desired, then be subjected to a consolidation heat treatment. It has been found that a suitable mixture consists of 100 parts by weight of silver powder to 33 parts by weight of powdered silver chloride, but these proportions can be varied to include between 5 and 50 parts of silver chloride to every 100 parts by weight of silver powder.

In another embodiment, positive plates are formed by anodic processing of silver-powder plates in the compressed or sintered form in an electrolyte bath of hydrochloric acid or in a solution of a soluble metallic chloride such as sodium or potassium chloride. When any of the other halides are desired to be formed, the appropriate acid or salt, diluted with water for improved conductivity, can be substituted. The proportion of silver to halide can be arranged to be of the same order as above by well-known electrochemical stoichiometric techniques.

In another embodiment the positive material can consist of a mixture of silver oxide and silver halide and the proportions of the halide to the oxide should be within the above range. In the last two embodiments it is possible to assemble the cells in their charged state.

When several electrode assemblies in individual casings, each containing a group of cells connected in parallel, are arranged in series to constitute a battery, it is not necessary for all the positive plates of the cells of each electrode assembly to have the same proportion of silver halide. It can for example be arranged that some of the positive plates are of silver only and some are a mixture of silver and silver halide. It is, however, desirable that the proper proportion of silver halide to silver be present in each electrode assembly and that preferably those plates which contain the halide be evenly distributed throughout the assembly.

Another aspect of this invention provides for the introduction into the cell itself of the halide in soluble form. During the processing of the cell through charge/discharge cycling, the soluble halide is deposited in and on the positive electrode in insoluble form, and the above-described benefits accrue.

In accordance with this aspect of the invention the halide in soluble form may be admixed with the electrolyte. The normal strength of KOH solution utilized as electrolyte in the silver/zinc cell has a specific gravity of 1.45; if such solution is saturated with a soluble halide, insufficient halide is then present to effect the desired improvement in the discharge characteristics of the cell. It is therefore necessary to reduce the strength of the KOH solution to enable more of the halide to be dissolved. A suitable strength of KOH solution has a specific gravity of 1.3 and a solution of this strength is saturated with sodium or potassium chloride, for example, and the cell filled with the same quantity of this modified electrolyte as it would have been with standard KOH solution. It is of distinct advantage to subject the cell so filled to at least one charge/discharge cycle, but in order to afford the full benefit of the addition of the halide at least three such cycles are advantageous.

The strength of the KOH solution can be varied considerably from the specific gravity of 1.45 but it is unadvisable to incorporate the soluble halide into a solution having a specific gravity of less than 1.2 unless the cell is intended for short-life applications only. Generally, KOH solutions having a specific gravity about 1.45 are too concentrated to take sufficient soluble halide to effect a worthwhile improvement in the discharge characteristics of the cell.

It will be appreciated that when the halide is introduced into the electrolyte the cell can be formed in its charged or discharged condition. If it is formed in its charged condition, i.e. with its positive plates of silver oxide and negative plates of zinc, it is necessary to discharge the cell and then to recharge it before any improvement in the discharge characteristics can be obtained.

If the cell is constructed in its discharged state, i.e. with a positive electrode of silver and a negative electrode of zinc oxide, some improvement in the discharge characteristics will be observed after the initial charging operation but again the maximum improvement will not be apparent until the third cycle of charge/discharge.

In another embodiment of the invention which may be employed where the cell is initially constructed in its discharged state, a soluble halide in liquid or powder form may be mixed with zinc oxide to form a negative plate. This method has the advantage over the incorporation of the halide in the electrolyte in that it enables a greater quantity of the soluble halide to be incorporated in the cell than could be dissolved in an electrolyte of any operative strength. This is thought to be so because an accumulative action ensues in which successive quantities of the halide are ionized and carried by the electrolyte to the positive plate during each successive charging operation.

Another modification provides for the incorporation of the soluble halide in the positive plate either by mixing it with silver in the uncharged condition of the cell or with silver oxide in the charged condition. In either case no appreciable benefit is obtained until the second charging operation is effected and again the greatest improvement is obtained after several charge/discharge cycles.

Although as stated above the soluble halide has consisted of potassium and sodium chloride, this can equally well be the chlorides of lithium, ammonium, calcium, magnesium, zinc, aluminum and other metals or mixtures thereof. Furthermore other halides can be used. It has been found that bromides and fluorides are particularly suitable, but iodides may also be used.

In all the embodiments of the present invention after the cell has been charged and discharged a number of times it is found that the discharge occurs at a steady voltage level between 1.50 and 1.55 volts for over 90% of the available capacity of the cell. It is thought that the halides in or transported to the positive electrode form some oxy-halide complex of silver under the influence of the charging process, and that this complex or discharge has an electrode potential essentially the same as that of the silver oxide. It will be understood that the above appears to be a purely theoretical explanation for the actual and practical phenomena observed in the cell of this invention. Other such explanations may be equally valid without detracting from the valuable practical benefits of our cell.

As will be apparent, the primary features of this invention reside in the composition of a novel positive electrode and its combination with a negative electrode of a material more electronegative than silver. Zinc negatives have been described above, yet negatives of iron and cadmium have likewise proved useful and batteries embodying such negatives will also have substantially constant voltage discharge curves.

This invention is of course not limited to the specific embodiments shown and described, some of whose features may be readily changed in form or otherwise modified without thereby departing from the spirit and scope of the appended claims.

What is claimed is:

1. An electrochemical cell of the alkaline type comprising at least one negative electrode and at least one positive electrode, said positive electrode including a combination of silver oxide and silver halide as its active material, said halide being present in a proportion of substantially 5% to 33% of said active material.

2. A cell according to claim 1, wherein the silver halide is silver chloride.

3. A cell according to claim 1, wherein the negative-electrode material is chosen from the group consisting of magnesium, zinc and cadmium.

4. An electrochemical cell of the alkaline type having at least one negative electrode and at least one positive electrode and exhibiting a substantially constant discharge voltage, said negative electrode comprising zinc and said positive electrode comprising as its active material a combination of silver compounds with oxygen and halogen, the proportion of halogen compound ranging between substantially 5% and 33% of said active material.

References Cited in the file of this patent

UNITED STATES PATENTS

| | | |
|---|---|---|
| 692,298 | Junger | Feb. 4, 1902 |
| 1,662,866 | Salazar | Mar. 20, 1928 |

FOREIGN PATENTS

| | | |
|---|---|---|
| 712,561 | Great Britain | July 28, 1954 |